United States Patent
Bayer

[11] 4,006,310
[45] Feb. 1, 1977

[54] NOISE-DISCRIMINATING VOICE-SWITCHED TWO-WAY INTERCOM SYSTEM

[75] Inventor: Robert S. Bayer, Newfoundland, N.J.

[73] Assignee: The Mosler Safe Company, Hamilton, Ohio

[22] Filed: Jan. 15, 1976

[21] Appl. No.: 649,402

[52] U.S. Cl. .............................. 179/1 H; 179/1 P; 177/1 VC
[51] Int. Cl.² ........................................ H04M 9/10
[58] Field of Search ............... 179/1 FS, 1 H, 1 HF, 179/1 P, 1 VC Primary Examiner—George G. Stellar
Attorney, Agent, or Firm—Wood, Herron & Evans

[57] ABSTRACT

An intercom system for remote banking which facilitates communication between a teller terminal and a remotely located customer terminal. A two-way speaker is provided at the customer location and a separate microphone and a speaker are provided at the teller location. An amplifier in the communication path linking the two stations is connected such that normally its input is responsive to the customer two-way speaker with its output feeding the teller speaker, permitting the customer to talk to the teller. When the teller speaks into the microphone, and assuming certain conditions are met, the amplifier automatically switches to connect the teller microphone to the amplifier input and the customer two-way speaker to the amplifier output, permitting the teller to talk to the customer. To avoid switching communication direction in response to noise at the teller location, the system is additionally provided with a noise microphone located at the teller station for transducing ambient noise thereat, and means responsive to the output of the noise and teller microphones for switching the system to the teller speech transmission mode only when a source of teller speech is located within a predetermined region enclosing the teller speech microphone, which region excludes therefrom the noise microphone. Switching of the system to the teller speech transmission mode occurs, assuming a teller speech source is located within the predetermined region surrounding the teller microphone, notwithstanding that a source of noise is present, providing the noise source is located exteriorly of said predetermined region.

10 Claims, 3 Drawing Figures

NOISE-DISCRIMINATING VOICE-SWITCHED TWO-WAY INTERCOM SYSTEM

PRIOR ART

U.S. Pat. Nos. 3,588,360 and 3,849,603 are representative of known prior art.

BACKGROUND OF INVENTION

This invention relates to intercom systems and more particularly to a remote banking system intercom for communication between a bank teller location and a remote customer location.

In the drive-in banking field, a form of remote banking, the bank teller and customer are usually separated by a distance anywhere from 6 to 30 feet, with the customer being in this car and the teller in a fully-enclosed booth attached to the main bank building which has a window looking out on the customer terminal. There may be a single teller station uniquely associated with one customer unit, or alternatively several teller stations servicing an even larger number of customer units, with each teller being able to service any one of the customers. Such drive-in systems, whether multistation or not, permit the customer to conduct banking business from his car. In a related type of remote banking system, a sidewalk window is provided where customers, albeit not in cars, conduct their business from the sidewalk without having to enter the bank.

Remote banking systems of the types described require some method for transferring cash, checks, deposit slips and the like between the teller and the customer. In one form, a sliding drawer, controlled by the teller, is provided. The drawer is opened proximate the customer to permit the customer to deposit a check or cash therein. The teller then closes the drawer and thereafter removes the articles from the drawer. The teller then performs certain operations for accounting purposes before placing a receipt, cash, or the like in the drawer. The drawer is again opened to the customer to allow the customer to remove the item from the drawer. While a sliding drawer is commonly used, a pneumatic carrier conveying system is also used, the pneumatic carrier system taking the place of the sliding drawer. An advantage of the pneumatic carrier approach is that it permits the teller to be located large distances from the customer. Pneumatic systems are particularly adaptable to drive-in or walk-up banking systems having many customer locations serviced by one or more tellers.

In all remote banking systems an intercommunication system is necessary to permit conversation between the teller who is in an enclosed booth, and the customer who may be many feet away. The customer must be able to inform the teller of any special request he may have, for example, the type of change he would prefer, and the teller has to be able to speak to the customer, for example, to ask the customer to endorse a check.

Experience has shown that it is preferable to place the teller in control of the direction of communication for the intercom since it is the teller who most often must initiate conversation. Additionally, for ease of operation the communication system should operate with as little manual intervention as possible to permit the teller and the customer to use their hands for other purposes. Accordingly, by permitting the teller's voice to control the direction of communication, not only will the teller be in control but the teller's hands will be free to write or to use them for some other transaction-related purpose. Thus, the system is arranged such that normally it permits the customer to talk to the teller, but switches automatically when the teller talks to allow him to communicate with the customer.

In a remote banking system ambient noise is customarily present at the teller location. Such noise can be caused by the mechanical movement of the cash drawer and/or pneumatic carriers or originate from some other source of ambient noise at the teller location. If these ambient noises at the teller location occur when the customer is speaking, it is possible, particularly when the ambient noise level is high, that the voice switching circuitry of the system, if it cannot discriminate between teller speech and noise, will switch the direction of communication to the teller speech transmission mode, inadvertently cutting off the customer.

It is the primary object of this invention to provide an intercommunication system for remote banking installations of the type in which only the teller speech controls the direction of communication, which is capable of discriminating between ambient noise and speech occurring at the teller location such that the system switches to the teller speech transmission mode only in response to teller speech, thereby avoiding inadvertent communication direction switching due to ambient noise at the teller location.

This and other objects and advantages of the invention are achieved in a voice-operated bidirectional intercom system by providing a noise microphone at the teller location separate and apart from the teller speech microphone, and control means responsive to the amplified outputs of the noise and teller speech microphones for switching the system to the teller speech transmission mode when the outputs bear a predetermined relation to each other. Specifically, and to preclude such predetermined relation from being created in response to ambient noise, the overall gains of the noise and teller speech microphone channels are selected to cause the locust of points of different sound source positions, whereat equal electrical signal outputs of the noise and teller speech channels are produced by a sound source, to form a closed surface of relatively small diameter which envelopes the teller microphone while excluding from the interior thereof the noise microphone. When the teller speech and noise channel gains are so selected, a noise source lying exteriorly of the predetermined closed surface surrounding the teller microphone cannot cause electrical signal outputs of the noise and teller speech channels to bear the predetermined relationship necessary to switch the system to its teller speech transmission mode. In addition, and providing there is no noise source within the predetermined closed surface, when the teller speech and noise channel gains are selected as indicated, only a source of teller speech located within the predetermined closed surface surrounding the teller microphone can cause the outputs of the noise and teller speech channels to bear the predetermined relation necessary to switch the system to its teller speech transmission mode. Thus, the system discriminates between a source of teller speech located within the closed surface surrounding the teller speech microphone and a noise source located exteriorly thereof even though the intensity of the noise source measured at the teller microphone has a greater intensity than that of the speech source measured at the teller microphone.

In a preferred form of the invention the gains of the noise and teller speech microphone channels are adjusted such that the gain of the noise channel is approximately twice the gain of the teller speech channel, and the noise microphone located approximately eight inches behind the speech microphone, with the result that the region enclosing the teller microphone within which a teller speech source must be located to switch the system to its teller speech transmission mode has a radius of approximately 5 inches. With the region surrounding the teller speech microphone so dimensioned, the probability is small that a noise source would be located within the region, rendering the chances rather remote that the system could be inadvertently switched to its teller speech transmission mode by a noise source located within the active region of the teller microphone.

These and other advantages and objectives of the invention will become more readily apparent from a detailed description of a preferred embodiment thereof taken in conjunction with the accompanying drawings which form a part of this disclosure wherein:

Figure 1:
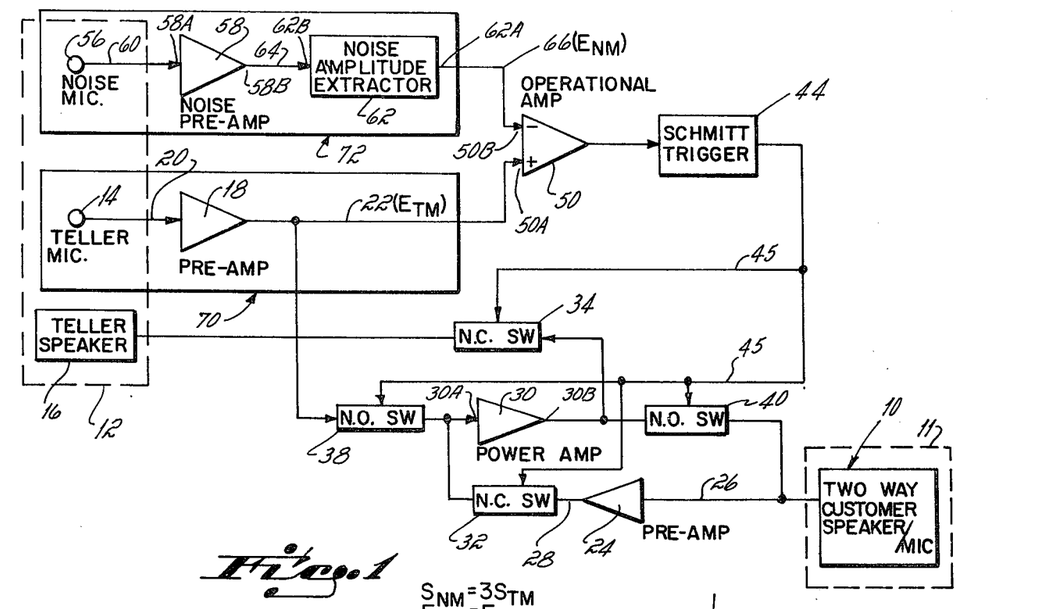
FIG. 1 shows a schematic diagram, in block circuit format, of a preferred embodiment of this invention.

Referring to FIG. 1, a schematic diagram is shown of an intercommunication system incorporating the invention which is particularly adapted for use in a remote banking system. A two-way speaker 10 is provided at the customer location 11, which operates as both a) a microphone for transducing customer speech for transmission to the teller and b) a speaker for reproducing teller speech transmitted to the customer. Also included, and located remote from the customer location 11 is a teller location 12 which includes, among other things, a teller speech microphone 14 for transducing the teller's speech for transmission to the customer two-way speaker 10 at the customer location 11, and a teller speaker 16 for reproducing at the teller location customer speech transmitted from the customer location. Further included in the system is a teller speech preamplifier 18 having its input connected to the teller speech microphone 14 via line 20 for preamplifying teller speech transduced by microphone 14. The preamplified teller speech provided by preamplifier 18 is output on preamplifier output line 22. A preamplifier 24 is provided for preamplifying customer speech originating at location 11 transduced by the customer two-way speaker 10. The preamplifier 24 has its input connected to the customer speaker 10 via line 26 and its output connected to a line 28.

In the preferred form of the invention a single power amplifier 30 is provided which is shared on a time basis by the teller and customer speech transmission channels, that is, is utilized to amplify the output of the customer preamplifier 24 when the communication system is in the customer speech transmission mode wherein the customer speech at location 11 is transmitted to the teller speaker 16 at location 12, or alternatively is used to further amplify preamplified teller speech output signals on line 22 when the system is in the teller speech transmission mode wherein teller speech originating at location 12 is transmitted to the customer location 11. Of course, separate power amplifiers could be used instead of the single, time-shared power amplifier 30.

To facilitate alternate, or time-shared usage of the single power amplifier 30, switch means are provided which in the customer speech transmission mode connect the output of customer preamplifier 24 to the input 30A of power amplifier 20 and the output 30B of power amplifier 30 to the teller speaker 16, and in the teller speech transmission mode connect the output of the teller preamplifier 18 to the input of the power amplifier 30 and the output of the power amplifier to the customer two-way speaker 10. The switch means, in one preferred form, includes a first normally closed switch 32 connected between the customer preamplifier output line 28 and the power amplifier input terminal 30A and a second normally closed switch 34 connected between the power amplifier output line 30B and the teller speaker 16. With switches 32 and 34 both normally closed the system is normally in the customer speech transmission mode such that customer speech originating at location 11 which is transduced by the two-way speaker 10 will be transmitted to the teller speaker 16 via a path including the customer preamplifier 24, normally closed switch 34, power amplifier 30, and normally closed switch 34. The switch means of the preferred embodiment further include a first normally open switch 38 connected between the output of the teller preamplifier 18 and the input 30A of the power amplifier 30 and a second normally open switch 40 connected between the output 30B of the power amplifier 30 and the customer two-way speaker 10 at location 11. With switches 38 and 40 normally open, preamplified speech from the teller speech microphone 14 output on line 22 from the teller speech preamplifier 18 will not be input to the power amplifier 30 at terminal 30A, and amplified speech output from the power amplifier 30 at terminal 30B will not be input to the two-way customer speaker 10.

To facilitate switching of the normally closed switches 32 and 34 to an open circuit condition and switching of normally open switches 38 and 40 to a closed circuit condition to facilitate transmission of teller speech originating at location 12 and reproduction thereof at location 11 and the blocking of transmission of customer speech originating at location 11 to the teller location 12, means are provided which include a threshold detector 44, which in a preferred form is a Schmitt trigger. The Schmitt trigger 44 is indirectly responsive, among other things, to the preamplified teller speech output on line 22 from the teller preamplifier 18 which is input to the Schmitt trigger via an operational amplifier 50, or other suitable circuit such as a summing network, comparator or the like, to be described hereafter. The output of the threshold detector 44, which is a two-state circuit device, is input to switches 32, 34, 38 and 40 via line 45, and is normally operative in a customer state placing switches 32 and 34 in their normally closed condition and switches 38 and 40 in their normally open position to facilitate a) transmission of customer speech originating at location 11 to the teller location 12, and b) blockage of transmission to customer location 11 of teller speech originating at location 12 when the teller speech fails to meet certain criteria to be described hereafter.

Specifically, should the mouth of the teller, which constitutes the teller speech source, be located within a predetermined region (to be described) with respect to the teller speech microphone 14 and the audible speech level of the teller speech be at a predetermined level with respect to the ambient noise level at the teller location (should such noise exist), and assuming that a source of the noise at the teller location 12 (should such noise source exist) is not within the predetermined region relative to the teller speech microphone 14 (to be described), preamplified teller speech output on line 22 which is input to the Schmitt trigger 44 via the summing circuit 50 will switch the Schmitt trigger 44. When the Schmitt trigger 44 has switched the normally open switches 38 and 40 are placed in a closed circuit condition enabling preamplified teller speech output on line 22 to be input to the customer two-way speaker 10, thus placing the system in the teller speech transmission mode. Simultaneously, normally closed switches 32 and 34 prevent any output on line 28 from the customer preamplifier 24 from being input to the power amplifier 30, as well as prevent the output of the power amplifier 30 from being input to the teller speaker 16.

Thus, while the system is normally in a customer speech transmission mode enabling speech originating at the customer station 11 to be transmitted to the teller location 12, the system can be switched to the teller speech transmission mode permitting teller speech originating at location 12 to be transmitted to the customer location 11 when certain conditions are met, namely, a) the source of teller speech is located within a predetermined region with respect to the teller microphone 14 and there is not, within the same region a source of noise, and b) further, if there is a source of noise which is located outside the specified region surrounding the teller microphone, that the audible level of the teller speech bears a predetermined relationship to the audible level of the noise. These conditions are more fully described hereafter.

The system further includes a noise microphone 56 located at the teller location 12 which transduces ambient noise originating at the teller location. The noise microphone 56 has associated with it a noise preamplifier 58 which has its input terminal 58A connected to the noise microphone via line 60 and its output 58B connected to a noise amplitude extractor circuit 62 via line 64. The noise preamplifier 58 preamplifies ambient noise originating at the teller location 12 transduced by the noise microphone 56.

The noise amplitude extractor 62 provides on its output terminal 62A a signal having an amplitude correlated to the amplitude of the preamplified noise input at terminal 62B from the noise preamplifier 58 on line 64. The signal present at output 62A of the noise amplitude extractor circuit 62, while being correlated to the amplitude of the preamplified noise on line 64, is substantially independent of both the frequency and phase content of the preamplified noise input to the noise amplitude extractor circuit 62 at terminal 62B. The signal on terminal 62A correlated to the amplitude of the noise originating at teller station 12 is input via line 66 to the summing circuit 50 which, as it will be recalled, also has an input on line 22 from the teller speech preamplifier 18 which is correlated in signal level to the audible level of the teller speech originating at teller location 12.

Figure 3:
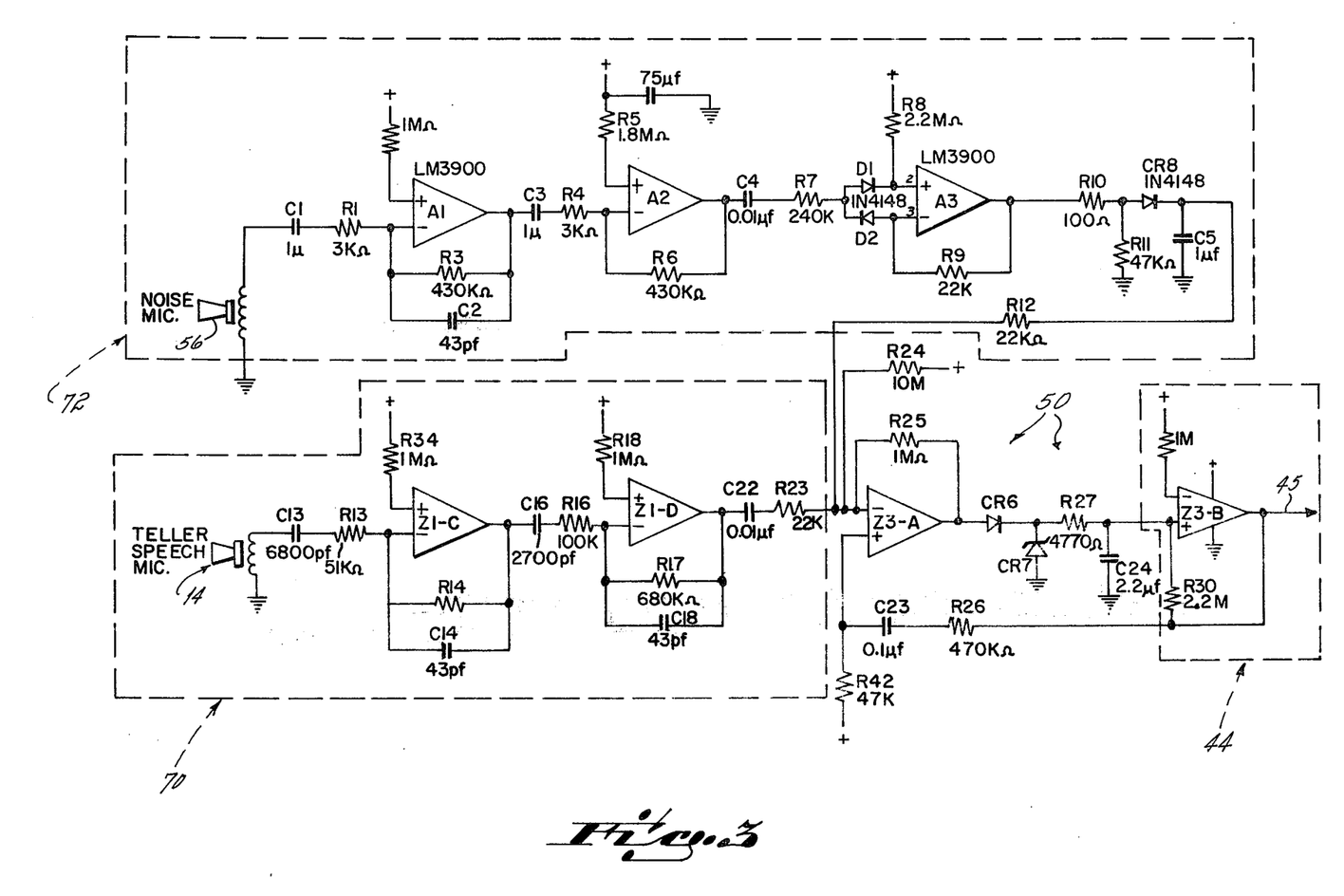
FIG. 3 is a detailed circuit diagram of one form of a portion of the system shown in FIG. 1.

The teller speech microphone 14, preamplifier 18, and other circuit components between the microphone 14 and summing circuit input terminal 50A constitute a teller speech channel 70 (FIG. 3). The noise microphone 56, noise preamplifier 58, noise amplitude extractor 62 and any other circuit components between the noise microphone 56 and the input terminal 50B of the summing circuit 50 constitute a noise channel 72 (FIG. 3). If the output of the teller speech channel 70 input to summing circuit terminal 50A exceeds the output of the noise channel 72 input to the summing circuit terminal 50B by a predetermined amount equivalent to the threshold level of the Schmitt trigger 44, the Schmitt trigger 44 will switch the system from its normal customer speech transmission mode wherein speech originating at customer station 11 is transmitted to the teller speaker 16 at location 12 to the teller speech transmission mode wherein teller speech will be transmitted to the customer two-way speaker 10 at location 11 for reproduction thereat.

Figure 2:
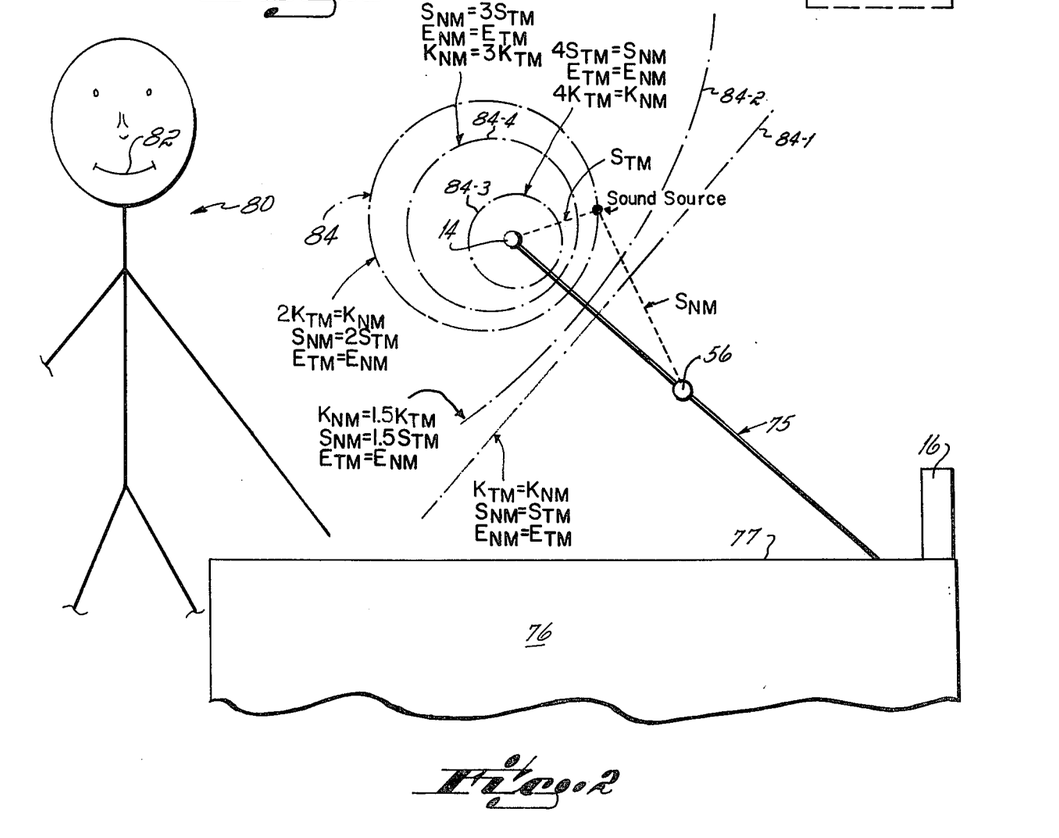
FIG. 2 is a side elevational view of a teller location showing the relationship of the customary position of the teller with respect to those components of the invention located at the teller station.

With reference to FIG. 2 depicting in side elevation the teller location 12, it will be seen that in a preferred form of the invention the teller speech microphone 14 is mounted at the outer or free end of an elongated support 75 which is anchored at its lower end to a counter 76 having, for example, a horizontal work surface 77. Located proximate the point where the elongated shaft 75 is mounted to the work surface 77 of the counter 76 is the teller speaker 16. The length and angulation of the shaft 75 relative to the counter 76 is selected to locate the teller speech microphone 14 such that the teller, schematically shown by reference numeral 80, can, when he desires to talk to the customer, conveniently position his mouth 82, which constitutes a source of teller speech, within a predetermined region 84 (to be described) which completely encloses the teller speech microphone 14. In a preferred form of the invention the region 84, which will be described in greater detail hereafter, is approximately spherical, has a radius of approximately 5 inches, and has the teller speech microphone 14 eccentric thereto. Also preferably mounted on the shaft 75 is the noise microphone 56. The noise microphone 56 is mounted exteriorly of the region 84, preferably spaced from the teller speech microphone 14 at a distance in the range of 6–12 inches with approximately an 8 inch spacing between the two microphones being optimum. The noise microphone 56 must be located, with respect to the teller speech microphone 14, remote from the normal position of the teller who stands to the left of the counter 76 as depicted in FIG. 2. Stated differently, the noise microphone 56 must be located such that the teller speech microphone 14 lies between the noise microphone 56 and the normal position of the teller, in particular the normal position of the teller's mouth which constitutes a source of teller speech. This prevents the possibility that teller speech reaching noise microphone 56 would have an intensity thereat greater than that reaching speech microphone 14.

By way of review, and as indicated previously, the circuit of FIG. 1 is normally in the customer speech transmission mode such that speech input to the two-way speaker 10 at the customer location 11 is transmitted to the teller location 12 for reproduction by the teller speaker 16. Thus, the system, in its normal state, is predisposed and can, without switching of any switches, transmit customer speech originating at location 11 to the teller location 12 for reproduction thereat. However, and as also previously noted, under certain conditions the state of the switches 32, 34, 38 and 40 can be reversed to place the system in the teller speech transmission mode whereby speech originating at the teller location 12 is transmitted to the customer location 11 for reproduction thereat, the predetermined conditions being as follows:

a. the source of the teller speech, i.e., the teller's mouth 82, is located within the predetermined closed, approximately spherical region 84 surrounding the teller speech microphone 14;

b. a source of noise, should one exist at the time the source of teller speech is located within the region 84, is located exteriorly of the region 84; and c. the output of the teller speech channel 70 relative to the output of the noise channel 72 bears a predetermined relationship sufficient to switch the threshold detector 44 from its normal state in which the system is in the customer speech transmission mode with switches 32 and 34 closed and switches 38 and 40 open to the teller speech transmission mode in which switches 32 and 34 are open and switches 38 and 40 are closed.

For reasons to be explained hereafter, a source of noise (should one exist) located exteriorly of the region 84 (which noise source will, depending upon its location with respect to teller speech microphone 14 and noise microphone 56 be transduced to some extent by both microphones) can never result in the output of the teller speech channel 70 exceeding the output of the noise channel 72 which, if such occurred, would cause the threshold detector 44 to switch and place the system in the teller speech transmission mode. Thus, the system of this invention distinguishes between teller speech originating within the predetermined region 84 surrounding the teller speech microphone 14 and noise originating at a location exteriorly of the region 84, but possibly having a loudness or intensity measured at the noise source which is much greater than that of the teller speech intensity measured at the teller speech source.

The basic principle on which the system of this invention relies is that sound in air dissipates into an ever increasing volume as it travels from its source. The sound intensity at a distance from a source is inversely proportional to the distance from the source raised to some power as indicated by the following equation:

$$I \alpha 1/S^N$$

where
 I = sound intensity at a specified point in space,
 S = distance between said specified point and said sound source,
 N = an exponent of empirical value which depends on existing acoustical conditions.

In a closed room, the value of the exponent "N" generally lies between "one" and "two". Thus, if two microphones are placed some distance apart, such as the teller speech microphone 14 and the noise microphone 56 shown in FIG. 2, the sound intensity at each microphone resulting from a single sound source is: assuming $N = 1$, $$I_{TM} = AK \frac{1}{S_{TM}}$$

-continued $$I_{NM} = AK \frac{1}{S_{NM}}$$

where
 "$I_{TM}$" is the intensity at the teller microphone due to a source which is displaced from the teller microphone by a distance $S_{TM}$;
 "$I_{NM}$" is the sound intensity at the noise microphone due to a sound source located at a distance $S_{NM}$ from the noise microphone;
 "A" is the amplitude of the sound source; and
 "K" is a constant of proportionality.

Similarly, if the sound reaching the teller microphone 14 and noise microphone 56 is amplified by suitable amplifiers, such as those in the teller and noise channels 70 and 72, respectively, the amplified electrical signals present at the outputs thereof will be defined by the following equations:

$$E_{TM} = AK_{TM} \frac{1}{S_{TM}}, \text{ and}$$

$$E_{NM} = AK_{NM} \frac{1}{S_{NM}}, \text{ where}$$

$E_{TM}$ and $E_{NM}$ are the electrical signal outputs of the teller speech channel 70 and noise channel 72, respectively, due to a sound source of amplitude A located at distances $S_{TM}$ and $S_{NM}$ from the teller speech microphone 14 and noise microphone 56, respectively; and $K_{TM}$ and $K_{NM}$ are constants related to the microphone sensitivity characteristics and amplifier gain of the teller speech channel 70 and noise channel 72, respectively, at terminals 50A and 50B, respectively, of summing circuit 50.

For any given sound source having an amplitude A which is spaced from the teller microphone 14 and microphone 56 by distances $S_{TM}$ and $S_{NM}$, respectively, all space can be divided into two parts by a locus of all points where the sound source produces outputs from the teller speech channel 70 and noise channel 72 which are of equal magnitude. The exact position and shape of the locus where a sound source produces equal signals at teller speech and noise channel outputs 50A and 50B depends upon the proportionality constants $K_{TM}$ and $K_{NM}$ of the teller speech channel 70 and the noise channel 72, respectively. If the constants $K_{TM}$ and $K_{nm}$ for the teller speech channel 70 and the noise channel 72 are equal, the locus of points for all positions of the source whereat the source produces equal channel outputs will be a plane perpendicular to the line between the two microphones and equidistant from each. Increasing $K_{TM}$ for the teller speech channel 70, by increasing the sensitivity of the teller speech microphone 14 and/or increasing the gain between the output of the teller speech microphone 14 and the output of the teller speech channel at terminal 50A, causes the locus of points to become a closed surface which encloses the noise microphone. Similarly, if $K_{NM}$ for the noise channel 72 exceeds $K_{TM}$ for the teller speech channel 70, the locus of all points whereat a source produces equal amplified sound signals at channel output terminals 50A and 50B becomes a closed surface which encloses the teller speech microphone 14. Thus, if $K_{TM}$ is made less than $K_{NM}$ by increasing the noise channel gain or sensitivity of the noise microphone or decreasing the teller speech channel gain or sensitivity of the teller microphone, or any combination thereof which results in $K_{TM}$ being less than $K_{NM}$, the locus of points whereat a sound source produces equal output from the noise channel 72 and the teller speech channel 70 will become a closed surface enclosing the teller microphone 56.

In accordance with a preferred embodiment of the invention the microphone sensitivities and amplifier gains of the teller and speech channels 70 and 72, respectively, are selected such that $K_{TM}$ for the teller channel equals approximately 50% of $K_{NM}$ for the noise channel, i.e., $2K_{TM} = K_{NM}$ and the noise microphone spaced eight inches from the speech microphone. When this is done the locus of points of equal channel outputs becomes an approximately spherical region 84 having a radius of approximately 5 inches with the teller microphone eccentrically located within the sphere 84 as shown in FIG. 2. In accordance with this preferred embodiment, the noise microphone 56 is located exteriorly of the region 84 at a distance from the teller speech microphone 56 of 6-12 inches, preferably at a distance of 8 inches.

With the system of this invention it is not possible for a noise source, regardless of intensity, located exteriorly of the region 84 to cause the output of the teller speech channel 70 at terminal 50A to exceed the output of the noise channel 72 at terminal 50A to exceed the output of the noise channel 72 at terminal 50B by an amount sufficient to switch threshold detector 44 and place the system in the teller speech transmission mode. Hence, there can be no false switching of the system from the normal, i.e., customer speech transmission mode, to the teller speech transmission mode by noise occuring at the teller location, regardless of the intensity of the noise, providing that the noise source is located exteriorly of the region 84. Since the region 84 is made sufficiently small, encloses the teller speech microphone 14, and excludes the noise microphone 56 from within its enclosed region, it is extremely unlikely that a noise source could occur which would be located within the region 84 and switch the system to its teller speech transmission mode. Of course, were the teller to clap his hands within region 84, establishing a "noise" source within this region, the system could switch to the teller speech transmission mode, assuming the amplified noise level were sufficient to exceed the threshold of Schmitt trigger 44.

As will be understood by those skilled in the art, as $K_{TM}$ associated with the teller speech channel 70 becomes larger relative to $K_{NM}$ associated with the noise channel 72, the radius of the sphere constituting the locus of points whereat a sound source produces equal outputs are provided at terminals 50A and 50B, will increase, too. While this enables the teller to switch the system to the teller speech transmission mode by locating his mouth 82, which constitutes the source of teller speech, at a greater distance from the microphone 14, it also increases the probability that a noise source could become located within the enlarged sphere and inadvertently switch the system to the teller speech transmission mode.

It should also be apparent to those skilled in the art that even though a source of noise may not exist, or if a noise source does exist it is located exteriorly of the region 84, speech of the teller must originate within the sphere 84 and in addition be of a level, depending on its distance from the microphone 14 and the level and position of the noise source, sufficient to cause the output of the summing circuit 50 to exceed the threshold of the threshold detector 44 and switch the system to its teller speech transmission mode. Thus, it is possible for a source of teller speech to be within region 84, but be of insufficient intensity relative to the intensity of a noise source located exteriorly of the region 84, to produce an output from the summing circuit 50 of sufficient magnitude to exceed the threshold 44 and switch the system to its teller speech transmission mode.

As will also be apparent to those skilled in the art, the output of the noise channel at terminal 50B, instead of being summed against the output of the teller speech channel 70 at terminal 50A, could be directly input to the threshold detector 44 to alter the threshold thereof. In this case the summing amplifier 50 could be eliminated and the output of the teller speech channel input directly to the threshold detector 44, with the threshold detector 44 switching when the input from the teller speech channel 70 exceeds the varying threshold established by the varying output of the noise channel 72.

It has been found that both the teller microphone 14 and the noise microphone 56 can be of the omnidirectional type and that when both of these microphones are omnidirectional that the system of this invention provides satisfactory discrimination against noise sources located exteriorly of the predetermined region 84. Under certain circumstances, particularly where the teller location is characterized by having multiple acoustic reflection paths, it has been found that by replacing the teller microphone with a highly directional microphone, noise discrimination is enhanced.

An advantage of this invention is that discrimination against noise at the teller location is provided without the need for providing the noise microphone 56 with baffles or the like which prevent teller speech from being incident on the noise microphone. A further advantage of this invention is that the noise microphone and the teller microphone can be located relatively close together, e.g., 6-12 inches apart. This simplifies the structural mounting requirements for both the teller and noise microphones. For example, both the teller speech and the noise microphones can be mounted on the same support. Additionally, relatively close mounting of the noise and teller speech microphone simplifies the required electrical wiring necessary to connect the teller and noise microphones with their respective preamplifiers.

If the response of the teller speech and noise channels 70 and 72, respectively, and/or the response of the operational amplifier 50 and Schmitt trigger 44 was instantaneous, a noise source located exteriorly of the region 84, but closer to the teller speech microphone 14 than the noise microphone 56, could theoretically cause an instantaneous, but momentary, switching of the Schmitt trigger 44 from its normal mode due to the fact that sound from the noise source would reach the teller microphone, it being closer to the noise source than the noise microphone, before the noise reached the noise microphone. As a consequence, in the interval between the point in time when the noise reaches the teller microphone and the point in time when it reaches the noise microphone, the only channel having an output would be the speech channel. This, as noted, theoretically would switch the Schmitt trigger. Of course, once the noise reaches the noise microphone 56, an output would be provided to the operational amplifier 50 by the noise channel 72, causing the Schmitt trigger to revert to its normal state. In reality, this theoretical switching possibility, occasioned by differing propogation times, does not occur because the response characteristics of the teller and noise channels 70 and 72, respectively, and/or that of the operational amplifier 50 and Schmitt trigger 44 is not instantaneous, but at least exceeds the difference in propogation times to the teller and noise microphones 14 and 56 of noise from a source which is located closer to the teller microphone than to the noise microphone.

As has been described, the spherical region 84 shown in FIG. 2 represents the locus of points in space where a sound source will provide equal electrical signals $E_{TM}$ and $E_{NM}$ output from the teller speech and noise channel 70 and 72 for teller speech and noise channels having overall gains related by the equation $K_{NM} = 2K_{TM}$. The locus 84 satisfies the equation $S_{NM} = 2S_{TM}$. The regions 84-1, 84-2, 84-3 and 84-4 correspond to the locus of points for sound sources which provide equal teller speech and noise channel outputs $E_{TM}$ and $E_{NM}$ for channel gains having the relationship of $K_{TM} = K_{NM}$, $K_{NM} = 1.5K_{TM}$, $K_{NM} = 4K_{TM}$, and $K_{NM} = 3K_{TM}$, respectively. Regions 84-1, 84-2, 84-3 and 84-4 satisfy the equations $S_{NM} = S_{TM}$, $S_{NM} = 1.5S_{TM}$, $S_{NM} = 4S_{TM}$, and $S_{NM} = 3S_{TM}$, respectively. Thus, it is clear, that as the ratio $K_{NM}/K_{TM}$ increases from values of 1, 1 1/2, 2, 3 and 4 the locus of points in space satisfying the equation $E_{TM} = E_{NM}$ goes from a sphere of infinite radius, i.e., plane 84-1, to spheres of ever-decreasing radius 84-2, 84, 84-4 and 84-3, respectively.

Finally, and for a given ratio, $K_{TM}/K_{NM}$, as the distance between the teller speech and noise microphone is increased (or decreased), the diameter of the region 84 increases (or decreases); however, the overall shape of region 84 remains generally the same, namely, approximately spherical.

Applicant incorporates herein by reference the disclosure of U.S. Pat. No. 3,849,603 assigned to the assignee of this application.

A preferred form of the circuit which can be utilized to implement the teller microphone channel 70 and noise channel 72 of this invention is depicted in FIG. 3. With reference to this figure, the output of the teller speech microphone 14 is capacitively coupled to the input of a linear amplifier Z1-C, the gain of which is established by resistors R13 and R14. Capacitor C13 and resistor R13 in combination constitute a low frequency blocking filter network. The output of the amplifier Z1-C is capacitively coupled to the input terminal of a second linear amplifying stage Z1-D. Resistors R17 and R16 establish the gain of this stage, as did resistors R14 and R13 for the previous stage Z1-C. Similarly, capacitor C16 and resistor R16 function to block low frequency.

The output of linear amplifier stage Z1-D is capacitively coupled to current sensitive amplifier Z3-A which functions to provide at its output terminal a one-half wave rectified version of the input thereto with positive excursions at the output terminal corresponding to negative excursions at the input terminal. The output of amplifier Z3-A is at zero in the absence of teller speech input thereto. Connected to the output of amplifier Z3-A is a diode CR6, a resistor R27 and a capacitor C24 which collectively function as a peak detector to provide a d.c. signal proportional to the teller speech signal, extracting the amplitude content thereof. Frequency and phase content thereof are not retained. The output of the peak detector is input to a threshold detector which could, for example, be the Schmitt trigger 44 of FIG. 1.

The noise microphone 56 has its output capacitively coupled to the input of cascaded linear amplifying stages A1 and A2. Specifically, the output of the noise microphone 56 is capacitively coupled to the input of amplifier A1. The gain of amplifier stage A1 is controlled by resistors R1 and R3. The resistor R1 and the capacitor C1 connected between the noise microphone 56 and amplifier A1 in combination function as a low frequency blocking filter. The output of amplifier A1 is capacitively coupled to the input of amplifier A2. The capacitor C3 and resistor R4 constitutes a low frequency blocking filter. The gain of amplifier A2 is controlled by resistors R4 and R6.

The output of amplifier A2 is coupled via a capacitor C4 and a resistor R7, which constitute a low frequency blocking filter, to a pair of reverse connected diodes D1 and D2 which operate as a steering circuit to steer positive excursions to terminal 2 of amplifier A3 and negative excursions to terminal 3 of amplifier A3. The gain of amplifier stage A3 is controlled by resistors R7 and R9. The output of amplifier A3 is a full wave rectified version of the input to amplifier A3. The output of ampilfier A3 is coupled to a network including the series combination of a resistor R10, a diode CR8, a capacitor C5 connected between the cathode of diode CR8 and ground, and a resistor R11 connected between the anode of diode CR8 and ground. At the junction of the capacitor C5 and the cathode of the diode CR8 a signal is provided having a level correlated to the amplitude of the noise input to the noise microphone 56, but independent of the frequency and phase content of the noise. This output is connected via a resistor R12 to the input of the summing amplifier Z3-A. The resistor R12 between the junction of capacitor C5 and diode CR8 functions as a scaling resistor as does resistor R23.

The noise amplitude correlated signal input to the summing amplifier Z3-A via resistor R12 is a positive d.c. signal which functions to reduce the positive output of summing amplifier Z3-A attributable to negative excursions input via resistor R23 to the summing amplifier Z3-A from linear amplifying stage Z1-D associated with the teller microphone. Thus, the input to the summing amplifier Z3-A from the noise channel functions to reduce the output of the summing amplifier attributable to the input from the teller channel varying amounts depending upon varying levels of noise, the suppression being greater as the noise increases.

The overall mid-band gain of the amplifiers Z1-C and Z1-D of the teller channel is 40 db while the overall mid-band gain of the noise channel amplifiers A1, A2, A3 is 86 db. The low frequency cutoff of the noise channel is determined by C1/R1, C4/R7, and C3/R4 and is approximately 200 Hz. The upper frequency roll-off point is set by C2/R3 at 10 KHz. The time constant of C5/R12 extends the duration of the information from the peak detector to allow for acoustical propogation delays and room resonances. Amplifier Z3-A is a current sensitive device which functions as a current summing circuit with the output depending upon the net current input thereto at terminal 6 which serves as a current summing node. A net positive current to the input terminal drives the output to zero; a net negative current drives the output in a positive direction. The summing amplifier Z3-A functions to sum negative pulses output from the teller microphone channel 70 with positive pulses output from the noise microphone channel 72. If the positive current pulses from noise channel 72 are larger than the negative pulses from the teller channel 70, the output of summing amplifier Z3-A will be zero. If the negative signal from teller channel 70 is larger than the positive signal from the noise channel 72, the output of the summing amplifier Z3-A will be an amplified analog of the net negative current input to the summing amplifier Z3-A, with positive excursions at the output of amplifier Z3-A occurring in correspondence to negative excursions of the teller speech signal present at the input to the summing amplifier.

Having described the invention, what is claimed is:

1. An intercommunication system for a banking installation or the like comprising in combination:
    customer speech transducing and sound reproduction means located at a customer location;
    a teller speech microphone and a speaker located at a teller location subjected to ambient noise, said teller speech microphone and speaker being separate electrical components, said teller speech microphone being physically positioned at a first spatial point at said teller location accessible to said teller for facilitating placement of the mouth of said teller, which constitutes a source of teller speech, proximate said teller speech microphone when said teller wishes to speak;
    power amplifier means with an input and an output for amplifying audio signals;
    a teller speech preamplifier means connected to said teller speech microphone;
    switch means interconnecting said teller speech preamplifier, said teller speaker and said customer speech transducing and sound reproduction means, said switch means being normally operative in a customer speech transmission mode to connect said customer speech transducing means to said power amplifier input and to connect said power amplifier output to said teller speaker to facilitate transmission of customer speech from said customer location to said teller location, said switch means being selectively operative in a teller speech transmission mode to connect said teller speech preamplifier to said power amplifier input and to connect said power amplifier output to said customer sound reproduction means to facilitate transmission of teller speech from said teller location to said customer location;
    switch control means including:
    a. a two state threshold detector having an output connected to said switch means, said threshold detector being normally operative in a customer state to place said switch means in said customer speech transmission mode and selectively operative in a teller state to place said switch means in said teller speech transmission mode,
    b. a noise microphone located at said teller location at a second spatial point spaced from said first spatial point whereat said teller speech microphone is located,
    c. a noise preamplifier connected to said noise microphone,
    d. noise amplitude extractor means connected to said noise preamplifier for providing an output signal having a level correlated to the amplitude of amplified noise output from said noise preamplifier, said output signal level being substantially independent of the frequency and phase of said amplified noise output from said noise preamplifier, and
    e. control signal means responsive to the outputs of said noise amplitude extractor means and said teller speech preamplifier for providing a control signal to said threshold detector when said outputs of said noise amplitude extractor means and said teller speech preamplifier bear a predetermined relation for switching said threshold detector to its teller state which in turn causes said switch means to switch to its teller speech transmission mode;
    said noise microphone, noise preamplifier and noise amplitude extractor means defining a noise channel, said teller speech microphone and teller speech preamplifier defining a teller speech channel; and
    means establishing the amplifier gain and microphone sensitivity of said noise and teller speech channels to cause the locus of points of different sound source positions, whereat equal outputs of said noise and teller speech channels are produced by a sound source, to form a closed surface which envelopes said teller speech microphone while excluding from the interior thereof said noise microphone, whereby a noise source lying exteriorly of said closed surface cannot cause said outputs of said noise amplitude extractor means and teller speech preamplifier to bear said predetermined relation and produce said control signal to switch said threshold detector to its teller state and in turn switch said switch means to its teller speech transmission mode, and whereby further only a source of teller speech located within said closed surface in the absence of a noise source within said closed surface can cause said outputs of said noise amplitude extractor means and teller speech preamplifier to bear said predetermined relation to cause said threshold detector to switch to its teller state and in turn said switch means to switch to its teller speech transmission mode to facilitate transmission of teller speech from said teller location to said customer location.

2. The system of claim 1 wherein said noise microphone and teller speech microphone are spaced apart a distance in the approximate range of 6 inches to 12 inches.

3. The system of claim 2 wherein said noise microphone and teller speech microphone are spaced apart a distance in the approximate range of 8 inches.

4. The system of claim 1 wherein said closed surface is approximately spherical.

5. The system of claim 4 wherein said closed surface has a radius of approximately 5 inches, and said noise microphone and teller speech microphone are spaced apart a distance in the approximate range of 6 inches to 12 inches.

6. The system of claim 4 wherein said closed surface has a radius of approximately 5 inches and said noise microphone and teller speech microphone are spaced apart approximately 6 inches.

7. The system of claim 1 wherein said teller and noise channels each have overall gains $K_{TM}$ and $K_{NM}$, respectively, which are different, with $K_{TM}$ having a value approximately equal to $K_{NM}/2$.

8. An intercommunication system for a banking installation or the like comprising in combination;

customer speech transducing and sound reproduction means located at a customer location;

a teller speech microphone and a speaker located at a teller location subjected to ambient noise, said teller speech microphone and speaker being separate electrical components, said teller speech microphone being physically positioned at a first spatial point at said teller location accessible to said teller for facilitating placement of the mouth of said teller, which constitutes a source of teller speech, proximate said teller speech microphone when said teller wishes to speak;

power amplifier means with an input and an output for amplifying audio signals;

a teller speech preamplifier means connected to said teller speech microphone;

switch means interconnecting said teller speech preamplifier, said teller speaker and said customer speech transducing and sound reproduction means, said switch means being normally operative in a customer speech transmission mode to connect said customer speech transducing means to said power amplifier input and to connect said power amplifier output to said teller speaker to facilitate transmission of customer speech from said customer location to said teller location, said switch means being selectively operative in a teller speech transmission mode to connect said teller speech preamplifier to said power amplifier input and to connect said power amplifier output to said customer sound reproduction means to facilitate transmission of teller speech from said teller location to said customer location;

switch control means including:

a. a noise microphone located at said teller location at a second spatial point spaced from said first spatial point whereat said teller speech microphone is located, b. a noise preamplifier connected to said noise microphone, and c. noise amplitude extractor means connected to said noise preamplifier for providing an output signal having a level correlated to the amplitude of amplified noise output from said noise preamplifier, said output signal level being substantially independent of the frequency and phase of said amplified noise output from said noise preamplifier;

said noise microphone, noise preamplifier and noise amplitude extractor means defining a noise channel, said teller speech microphone and teller speech preamplifier defining a teller speech channel;

said switch control means being responsive to the outputs of said teller speech and noise channels for switching said switch means to its teller speech transmission mode when said outputs bear a predetermined relation; and means establishing the overall gains $K_{TM}$ and $K_{NM}$, respectively, of said teller speech and noise channels, respectively, at different values, with $K_{TM}$ less than $K_{NM}$, to cause the locus of points of different sound source positions, whereat equal outputs of said noise and teller speech channels are produced by a sound source, to form a closed surface which envelopes said teller speech microphone while excluding from the interior thereof said noise microphone, whereby a noise source lying exteriorly of said closed surface cannot cause said outputs of sad noise and teller speech channels to bear said predetermined relation and switch said switch means to its teller speech transmission mode, and whereby further only a source of teller speech located within said closed surface in the absence of a noise source within said closed surface can cause said outputs of said noise and teller speech channels to bear said predetermined relation to cause said switch means to switch to its teller speech transmission mode to facilitate transmission of teller speech from said teller location to said customer location.

9. The system of claim 1 wherein said teller speaker is located exteriorly of said closed surface.

10. The system of claim 8 wherein said teller speaker is located exteriorly of said closed surface.

* * * * *

UNITED STATES PATENT AND TRADEMARK OFFICE
CERTIFICATE OF CORRECTION

PATENT NO. : 4,006,310
DATED : February 1, 1977
INVENTOR(S) : Robert S. Bayer

It is certified that error appears in the above-identified patent and that said Letters Patent are hereby corrected as shown below:

| | | | |
|---|---|---|---|
| Col. 1 | Line 17 | "this" | should be --his-- |
| Col. 4 | Line 28 | "34" | should be --32-- |
| Col. 8 | Line 50 | "K$_{nm}$" | should be --K$_{NM}$-- |
| Col. 12 | Line 27 | "ampilfier" | should be --amplifier-- |
| Col. 16 | Line 27 | "sad" | should be --said-- |

Signed and Sealed this

Fourteenth Day of February 1978

[SEAL]

Attest:

RUTH C. MASON
*Attesting Officer*

LUTRELLE F. PARKER
*Acting Commissioner of Patents and Trademarks*